H. A. HOUSEMAN.
CIRCULAR KNITTING MACHINE.
APPLICATION FILED SEPT. 22, 1915.

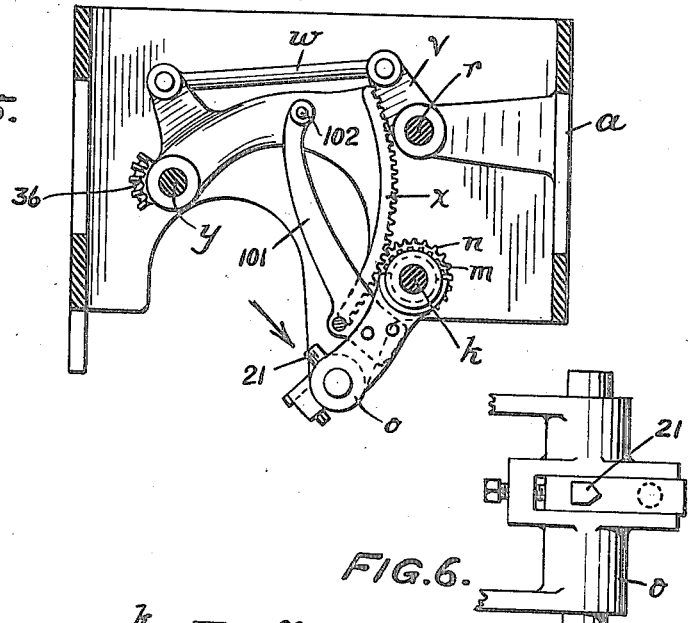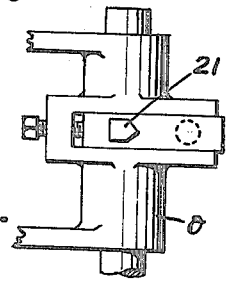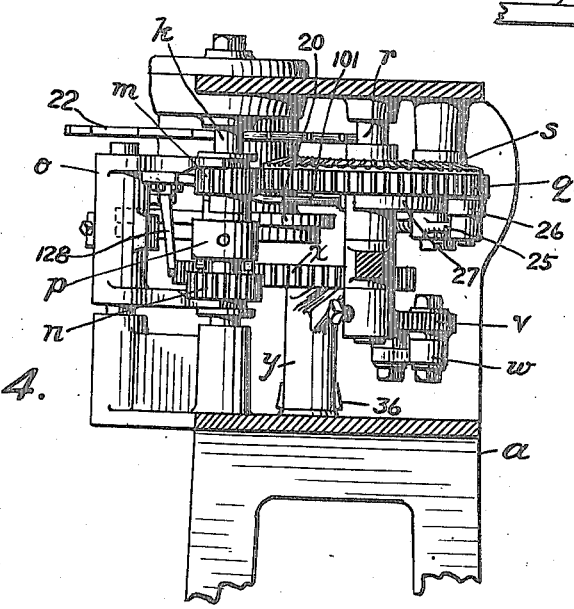

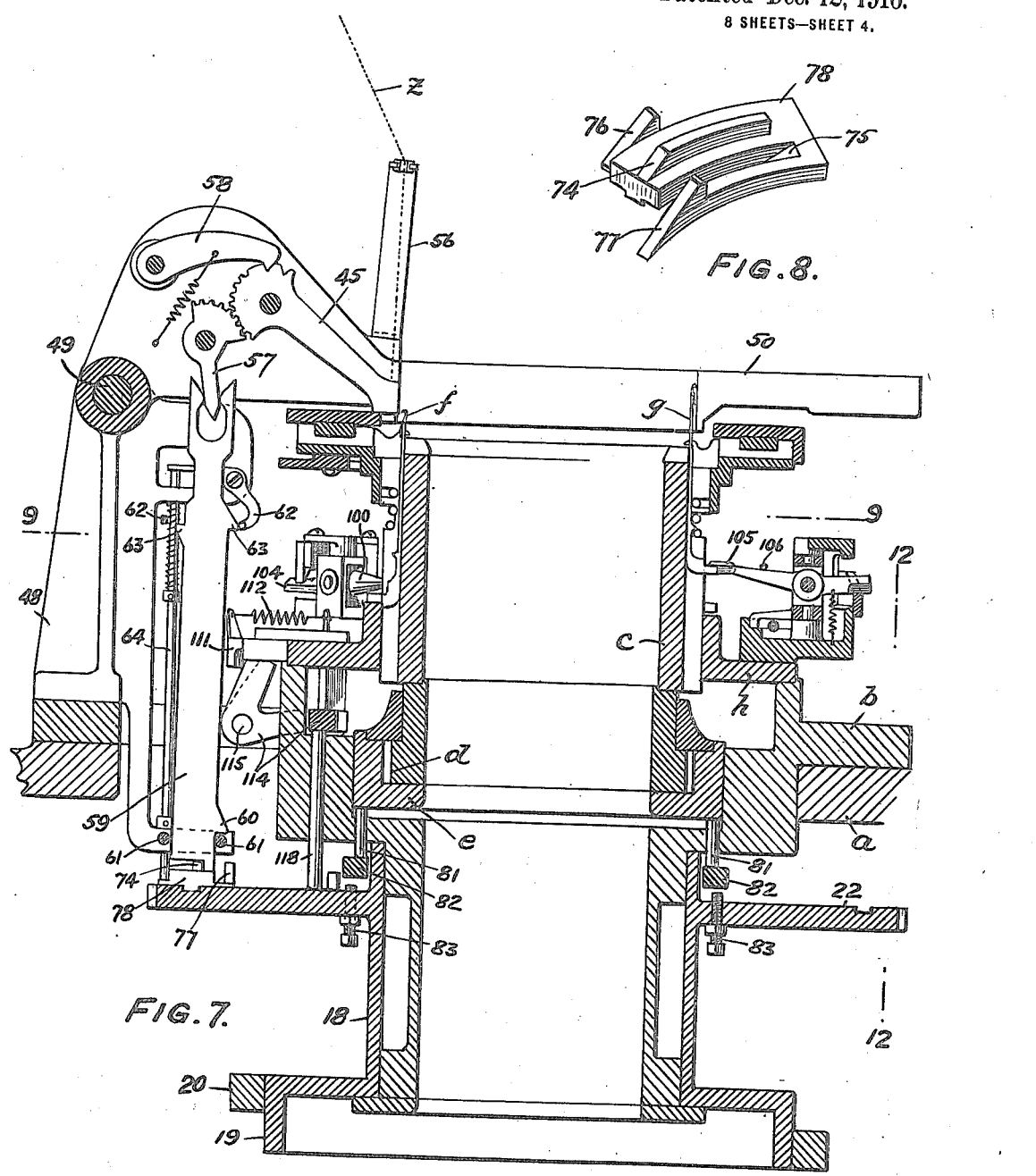

1,207,757.

Patented Dec. 12, 1916.
8 SHEETS—SHEET 6.

WITNESS:
Rob't W Kitchel

INVENTOR
Harry A. Houseman
BY
Frank S. Busser
ATTORNEY.

H. A. HOUSEMAN.
CIRCULAR KNITTING MACHINE.
APPLICATION FILED SEPT. 22, 1915.
1,207,757.
Patented Dec. 12, 1916.
8 SHEETS—SHEET 7.
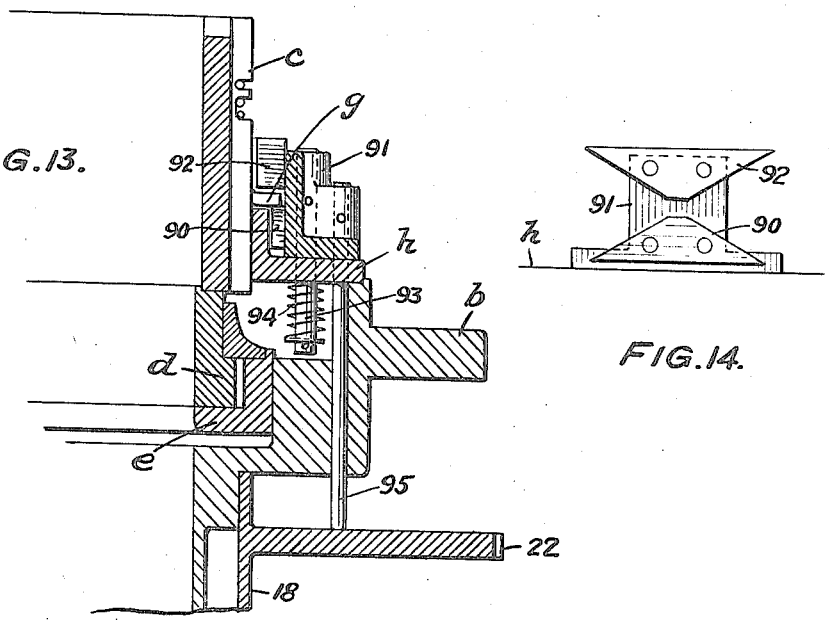
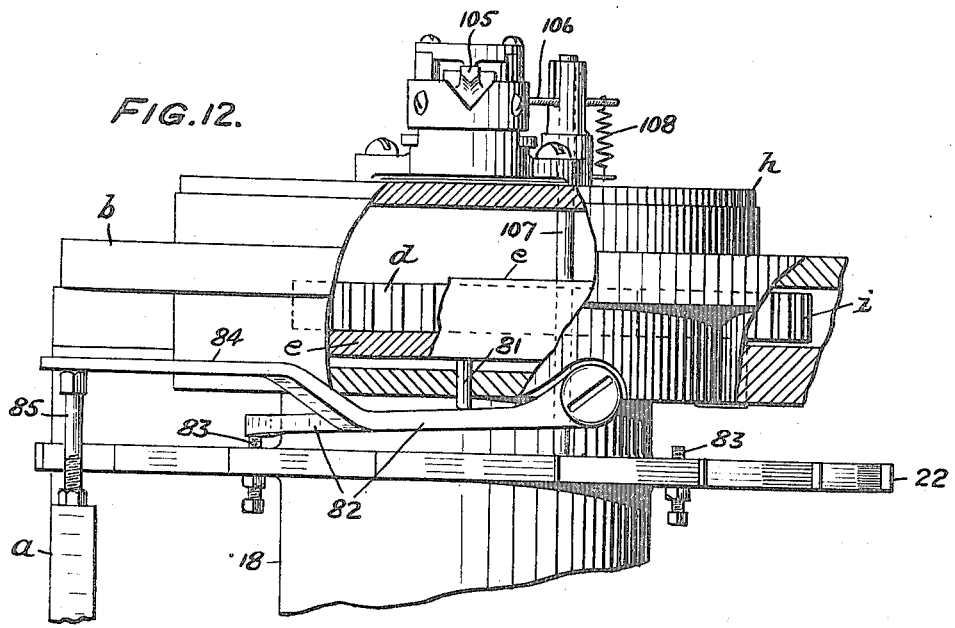
WITNESS:
INVENTOR
Harry A. Houseman
BY
ATTORNEY.

UNITED STATES PATENT OFFICE.

HARRY A. HOUSEMAN, OF PHILADELPHIA, PENNSYLVANIA, ASSIGNOR TO STANDARD MACHINE COMPANY, OF PHILADELPHIA, PENNSYLVANIA, A CORPORATION OF PENNSYLVANIA.

CIRCULAR-KNITTING MACHINE.

1,207,757.      Specification of Letters Patent.      Patented Dec. 12, 1916.

Application filed September 22, 1915. Serial No. 51,939.

*To all whom it may concern:*

Be it known that I, HARRY A. HOUSEMAN, a citizen of the United States, residing at Philadelphia, county of Philadelphia, and State of Pennsylvania, have invented a new and useful Improvement in Circular-Knitting Machines, of which the following is a full, clear, and exact description, reference being had to the accompanying drawings, which form a part of this specification.

The object of my invention is to provide a circular knitting machine which will be compact in construction and reliable in operation.

The novel features of my machine include the general arrangement as well as numerous improvements in details.

The invention is more especially adapted to that type of machine wherein the needle cylinder rotates and the cam plate and yarn carriers are non-rotatable, although many features of the machine are adaptable to non-rotatable needle-cylinder machines.

A preferred embodiment of my invention is shown in the accompanying drawings, in which—

Figure 1:
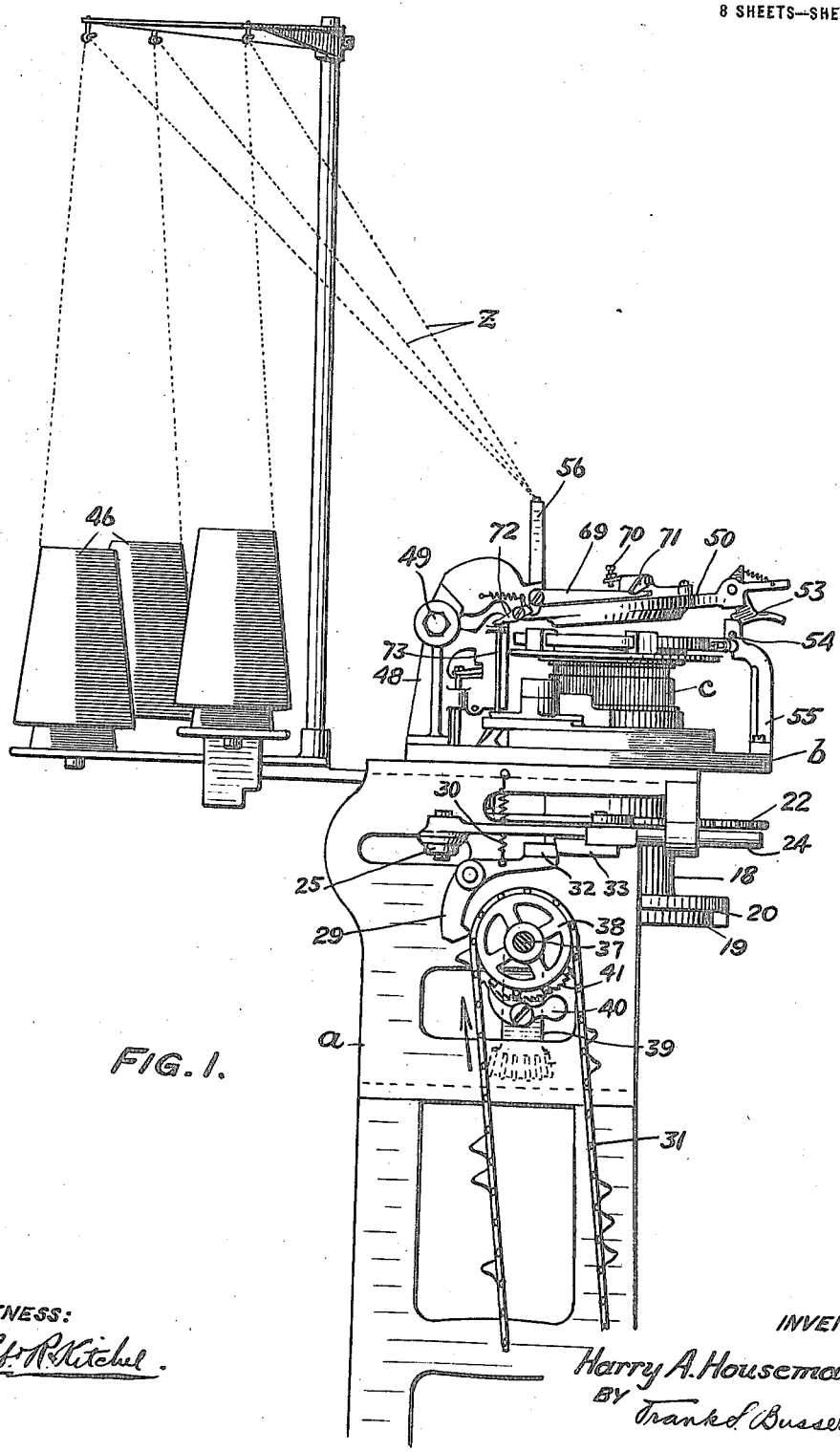
Figure 2:
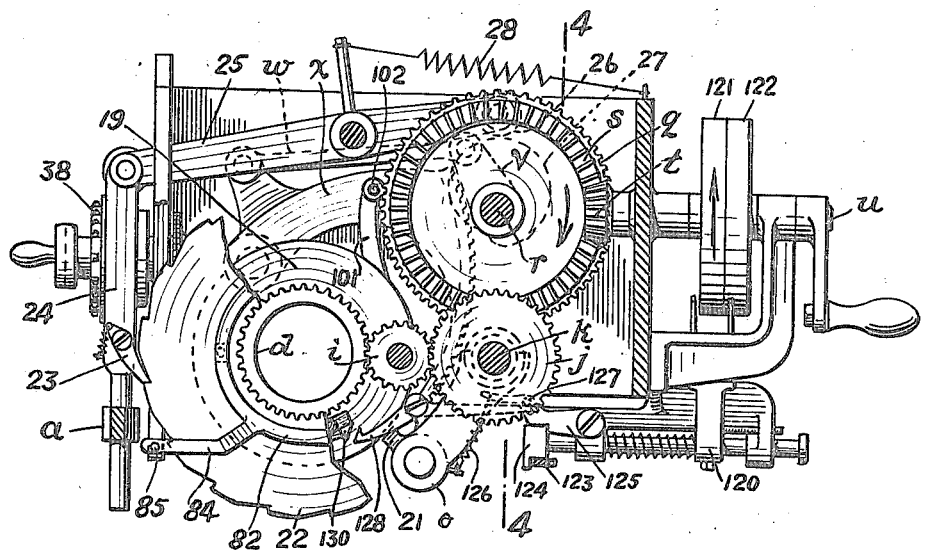
Figure 3:
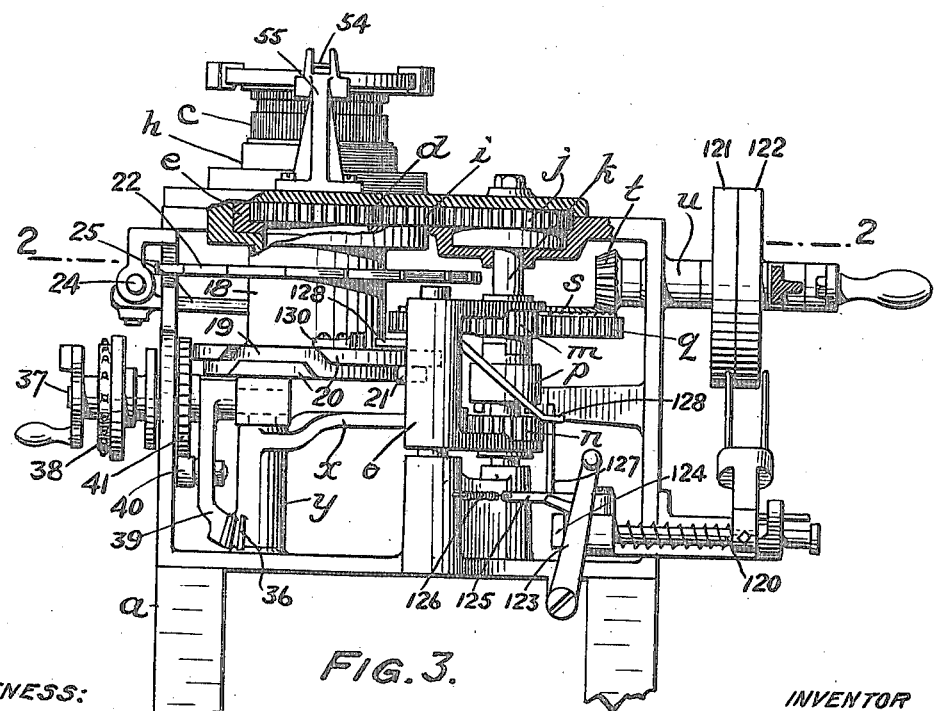
Figure 9:
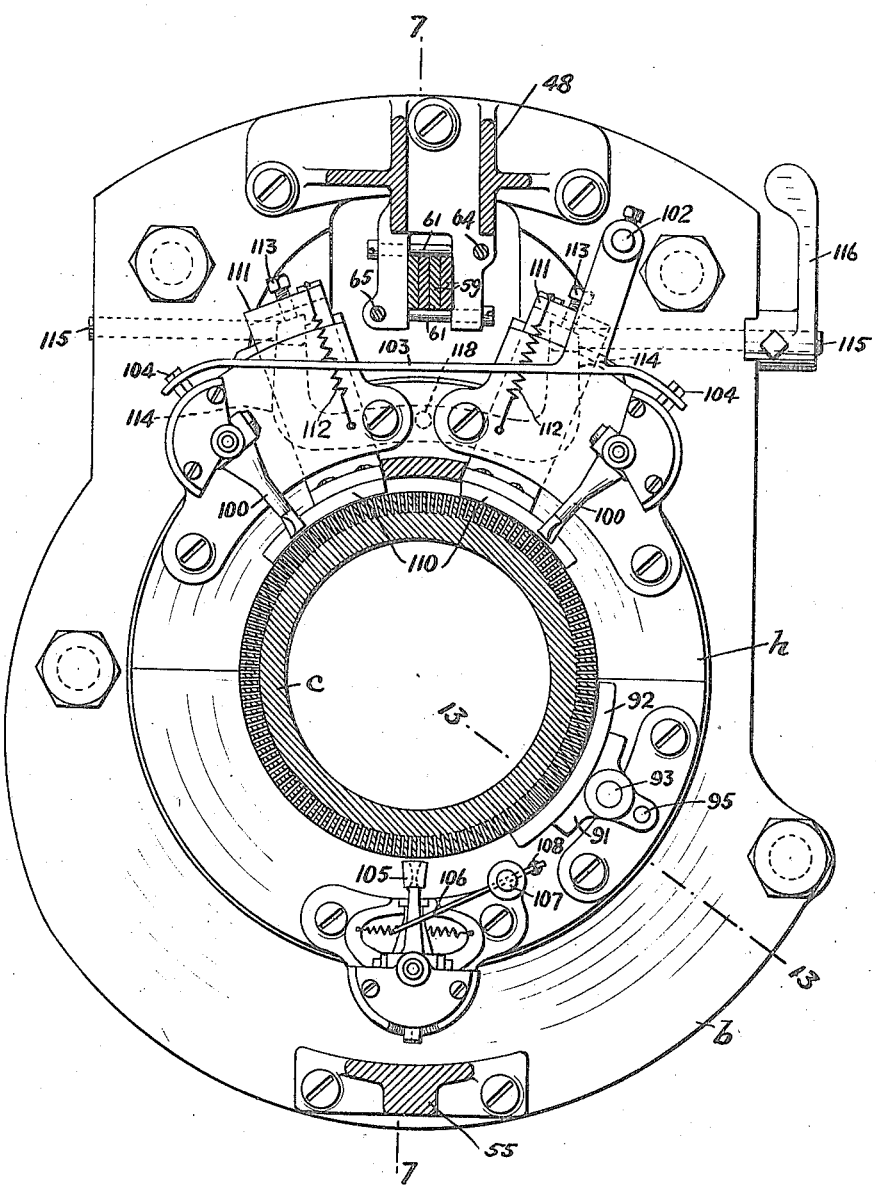
Figure 10:
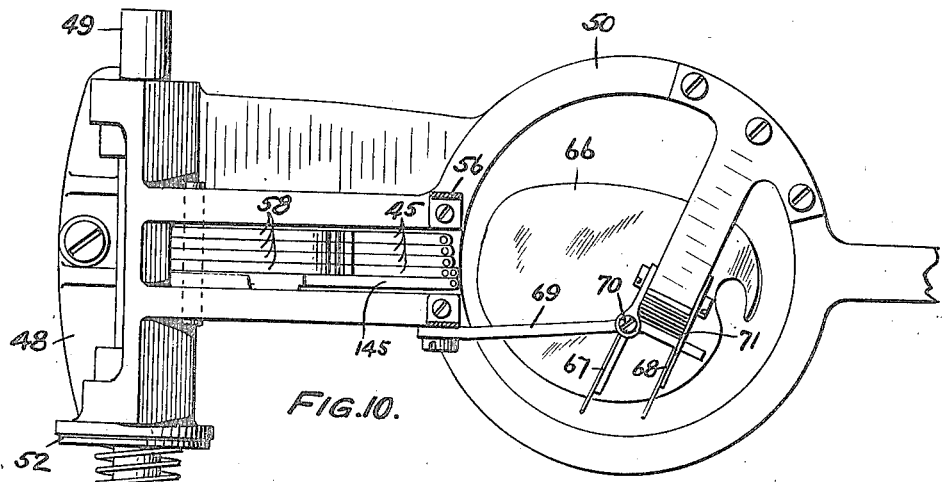
Figure 11:
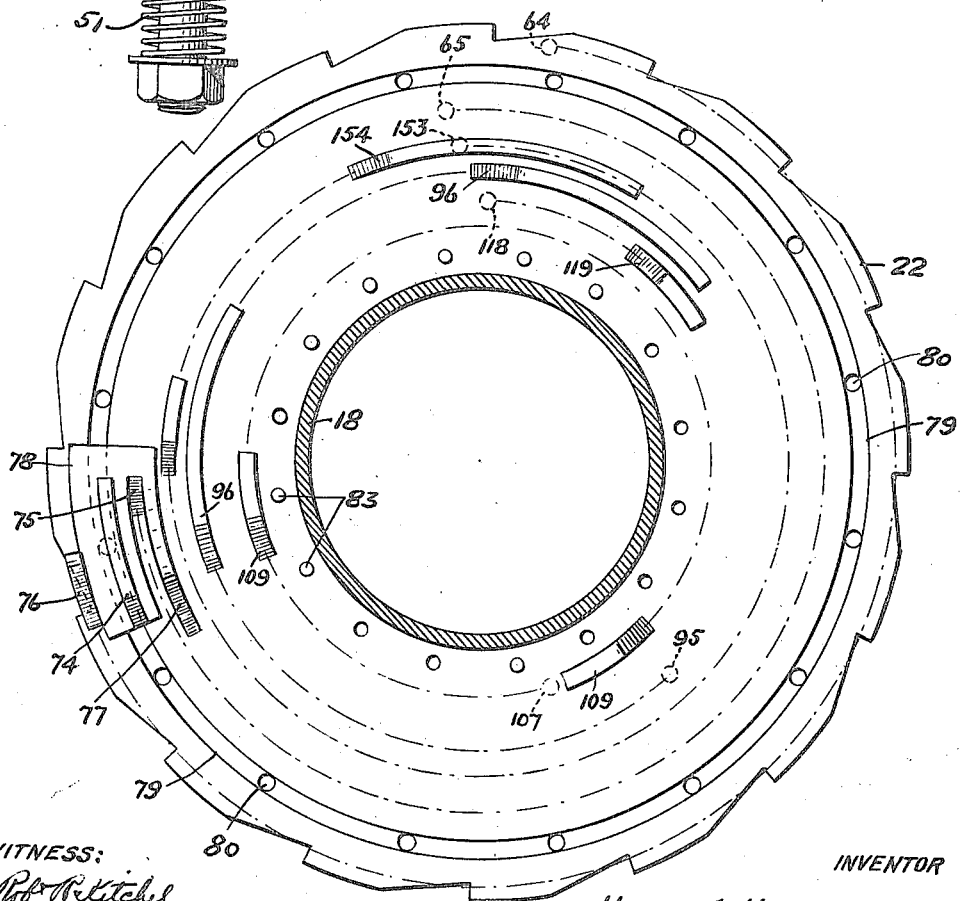
Figure 15:
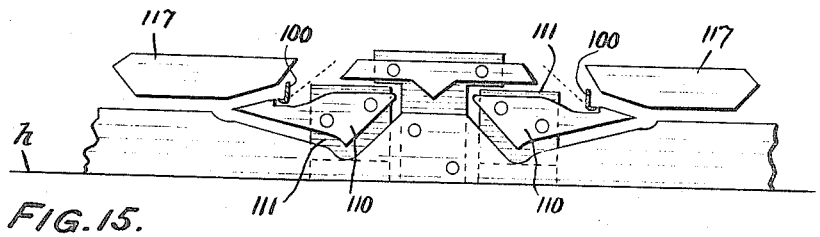
Figure 16:
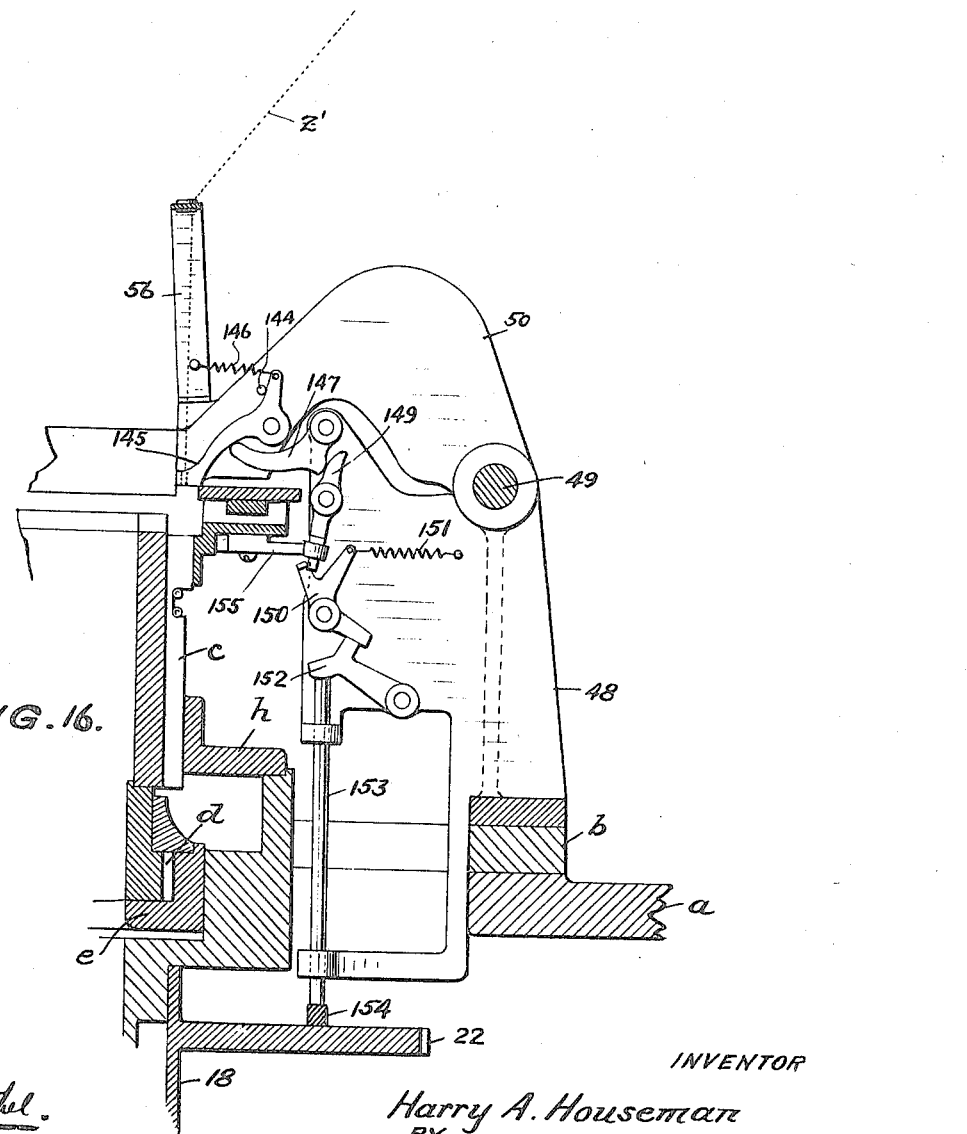

Figure 1 is a side elevation of the machine, partly broken away. Fig. 2 is a sectional plan view on line 2—2 of Fig. 3. Fig. 3 is a partial front view of the machine, with parts broken away. Fig. 4 is a vertical sectional view on line 4—4 of Fig. 2. Fig. 5 is a partial plan sectional view, similar to Fig. 2, but with parts omitted for clearness. Fig. 6 is an enlarged detail looking in direction of the arrow in Fig. 5. Fig. 7 is a detail sectional view of the knitting head taken on line 7—7 of Fig. 9. Fig. 8 is a perspective view of one of the yarn carrier cam plates. Fig. 9 is a cross section on line 9—9 of Fig. 7. Fig. 10 is a plan view of the top frame and parts carried thereby. Fig. 11 is a plan view of the cam disk. Fig. 12 is a partial front view of the head, broken away on line 12—12 of Fig. 7. Fig. 13 is a vertical section on line 13—13 of Fig. 9; Fig. 14 is a face view of the cams shown in Fig. 13. Fig. 15 is a face view of the knitting cams. Fig. 16 is a partial section on line 7—7 of Fig. 9, looking in the opposite direction to Fig. 7.

Referring first to Figs. 1 to 7 inclusive: *a* is the frame of the machine and *b* the bed plate for the needle cylinder, cam ring and appurtenant mechanism. The needle cylinder *c* has secured to its lower end the driven gear *d* (which is actuated as hereinafter described) resting directly upon the ring *e* within the bed *b*.

The rotatable needle cylinder *c* is provided with vertical radial slots extending inward from its outer wall, the needles *f*, *g* extending within these slots and being movable upward therein to render them inactive, as is well understood in the art. Supported on the top of the bed plate is the cam ring *h* which carries the knitting cams for actuating the needles.

As is well understood, during the knitting of the leg of the stocking and during the knitting of that part of the stocking between the heel and toe (hereinafter called the foot), the needle cylinder is continuously rotating and all the needles are down and in action. During the knitting of the heel and toe, the needle cylinder is oscillated and the needles *g* extending throughout one half the circumference of the needle bed (hereinafter referred to as the rear bank of needles) are initially thrown out of action. This is effected by providing the needles *g* with long butts and causing a cam (hereinafter described) to be moved into position to engage all the long butt needles and move them up out of action. During the oscillation of the needle cylinder, the needles *f* extending throughout the remaining semi-circumference of the needle bed (i. e. the front bank of needles) are thrown out of action one at a time, first at one end of the semi-circumference and then at the other end, and so on alternately until only a limited number of needles in the central part of the front bank is in action. The needles are then thrown back again into action one at a time in the reverse order in which they are thrown out. This operation is effected by means of two sets of pickers having, preferably, the construction and operation of the picker forming the subject matter of the patent issued to me June 6th, 1916, No. 1,186,099 and controlled by special mechanism hereinafter described.

Motion is imparted to the needle cylinder as follows (see particularly Figs. 2 and 3): Gear $d$ is driven through idler $i$ from gear $j$ on clutch shaft $k$, on which are slidably mounted the two pinions $m$ and $n$, which have sleeves to which are yoked the vertically movable arms of a frame $o$, which is actuated as hereinafter described. The clutch member $p$ is fixed on shaft $k$ between pinions $m$ and $n$. The upper pinion $m$ is constantly rotated and the lower pinion $n$ is constantly oscillated. When the frame $o$ is moved down, thus engaging the rotary pinion $m$ with clutch member $p$ and disengaging the oscillatory pinion $n$ therefrom, gear $j$ is constantly rotated, thus rotating the needle cylinder. When the frame $o$ is elevated, thus disengaging the rotary pinion $m$ from clutch member $p$ and engaging the oscillatory pinion $n$ therewith, gear $j$ is constantly oscillated, thus oscillating the needle cylinder.

Pinion $m$ is constantly rotated by being continually in mesh with a spur gear $q$, turning on a vertical shaft $r$ and having attached to it a bevel gear $s$ which is driven by a bevel pinion $t$ on driving shaft $u$. Pinion $n$ is constantly oscillated by the following means: Attached to the lower end of shaft $r$ is a crank $v$, connected by a link $w$ with an arm of a quadrant $x$, which is mounted upon a post $y$ and is constantly engaging pinion $n$.

The lowering and elevating of frame $o$, which dictates the change from oscillation to rotation and vice versa is accomplished as follows: Mounted on the lower extension of the bed plate $b$, and concentrically beneath the needle cylinder, is the sleeve 18 provided with the flange 19. Secured to the periphery of this flange are cams 20, with beveled ends, as shown in Fig. 3, forming a cam path therebetween.

Adjustably mounted on frame $o$ is a shoe 21, shown in detail in Figs. 5 and 6, which projects within said cam path, and is lowered and raised by riding along the beveled ends of cams 20 during the rotation of sleeve 18. Thus, when shoe 21 is riding under the upper cams, rotating pinion $m$ is in engagement with clutch member $p$ and the needle cylinder is rotated; and when shoe 21 is riding over the lower cams oscillating pinion $n$ is in engagement with clutch member $p$ and the needle cylinder is oscillated.

Sleeve 18 is given a step by step rotary motion dictated by a pattern chain and is actuated as follows: The sleeve carries a disk 22, hereinafter called the cam disk, (shown in detail in Fig. 11), with ratchet teeth on its outer circumference. The teeth may be of any convenient number, depending upon the possible number of changes of yarn and of shape required in knitting a stocking. Ordinarily, sixteen teeth give ample scope for variety in this regard.

The cam disk is actuated directly by a spring pressed pawl 23 mounted on a slide 24, one end of which passes through a bearing in frame $a$ and the other end of which is pivotally connected with a lever 25. Lever 25 is mounted on a vertical axis between its ends and projects through the frame of the machine to connect with slide 24. On its opposite end it carries a roller 26, in line to be acted upon by a cam 27 secured to the under side of the constantly driven gear $q$. Spring 28 tends to hold roller 26 constantly against said cam.

A bell crank lever 29 (see Fig. 1) is mounted upon frame $a$ and held by a spring 30 in a position with one of its ends in line to be acted upon by the lugs on a pattern chain 31, whose driving connections will be hereinafter described. The other end of lever 29 carries a toe 32 in position to act upon a lug 33 attached to slide 24, to hold said slide and pawl 23 carried thereby in their forward position, and to hold roller 26 from being acted upon by its cam 27.

The pattern chain 31 is given a constant step by step motion as follows (see Figs. 1, 3, 4 and 5): Mounted on post $y$ and connected with the hub of the constantly oscillatory quadrant $x$ is a section of a bevel gear 36. Sleeved upon shaft 37, which carries driving sprocket 38 of the pattern chain, is an arm 39 carrying a rack, or a portion of a bevel gear, which is in mesh with bevel gear section 36. Arm 39 carries a pawl 40 suitably mounted to act upon a ratchet wheel 41 fixed on shaft 37. Thus, the pattern chain is advanced one step at every oscillation of quadrant $x$ and therefore, at every revolution of gear $q$ and cam 27 carried thereby. When, therefore, in the actuation of ratchet 41, the pattern chain is advanced to a position to cause a lug thereon to actuate lever 29, toe 32 is moved out of engagement with lug 33, slide 24 is unlocked, spring 28 is free to move lever 25 to retract slide 24 as soon as roller 26 reaches the low point of cam 27, and pawl 23 drops back of the next tooth on cam disk 22; and as roller 26 rides onto the high point of cam 27, lever 25, slide 24 and pawl 23 are returned to the position shown in Figs. 1 and 3, thus advancing cam disk 22. When ratchet 41 is given its next impulse, roller 26 is still on the high point of cam 27, so that lug 33 is in position to permit toe 32 to snap back of it and lock slide 24 from being again retracted by spring 28 when roller 26 reaches the end of the high point of cam 27. Thus, each lug on the pattern chain effects the ratcheting forward of cam disk 22 a distance of one tooth and only one tooth and holds same in its advanced position.

In the manufacture of hosiery, yarns of different color and material are employed, for the use of which a plurality of yarn carriers 45 are provided and through which the various yarns z are led from their cops 46 to the needles. These yarn carriers, four of which are shown but which may be of any desired number, are pivotally mounted and are adapted to be normally held in an inactive position, with their threaded ends raised above the line of needles g, and to be lowered into active position as desired, by means, to be now briefly described, forming the subject of a separate patent issued to Harold E. Houseman November 23, 1915, No. 1,161,677.

Mounted on the bed plate at the rear of the knitting head (see Figs. 1, 3, 7, 9, 10 and 11) is a stand 48, to which is pivoted, on a stud 49, the top frame 50. A coiled spring 51, between a nut on the end of stud 49 and a friction disk 52, presses the latter against the hub of frame 50 with sufficient friction to overcome the weight of the frame, so that same may be conveniently raised by hand and will remain poised in any angular position. When down in active position over the top of the needle cylinder, top frame 50 is secured by a spring catch 53 engaging with a pin 54 on a stand 55 mounted on the bed plate in front of the knitting head.

A bracket 56 is mounted on the top frame and carries eyes through which the yarns z pass and are directed to the thread carriers 45, which also are mounted on top frame 50. The hubs of thread carriers 45 are toothed and engage with similarly toothed levers 57, which are also pivoted on frame 50. A detent lever 58 engages notches in the hub of each yarn carrier and holds same in either its active or inactive position. The depending lower ends of levers 57 extend within the forked ends of vertical bars 59 having projections 60 normally resting upon one of a pair of guide pins 61 in stand 48.

As shown on Fig. 7 the bar 59 therein shown is swung slightly to the right of its median position, thereby having caused its lever 57 to move its yarn carrier 45 down into active position as shown. It is clear that if this bar 59 is swung in the opposite direction, it will cause its lever 57 to elevate its yarn carrier out of action.

To so swing bars 59, two exactly similar bell crank levers 62 are pivoted on stand 48 and similarly arranged on opposite sides of bars 59. Each bar 59 has a projection 63 on each side, so arranged that when the bar is in the position shown in Fig. 7, resting upon pin 61, the projection 63 on one side of the bar 59 is in line with the prolonged end of one of the bell crank levers 62, while the projection 63 on the opposite side of the bar 59 is just below the line of action of the similar end of the other bell crank lever 62.

The bell crank levers are respectively operated by vertical rods 64, 65 actuated by cams to be hereinafter described. When so operated they will actuate such of the bars 59 whose projections 63 are in line of action of the prolonged ends of the bell cranks. That is, as shown, bar 59 is in position to be actuated by the projection 63 on the right, whereas if the bar were raised and also tilted to the left of the position shown, the projection 63 on the left would be in position to be acted on by its lever 62.

Each bar 59 has at its lower end a toe by which it may be thus raised by a suitable cam, with the result that those yarn carriers will be thrown out of action whose bars 59 rest upon pin 61, and those yarn carriers will be thrown into active position whose bars 59 are raised by such a cam. The toes of bars 59 are arranged out of line of one another, so that a cam may be arranged to act upon one bar without affecting the others.

Within top frame 50, and supported therefrom (see Figs. 1 and 10), is a yarn guiding plate 66 which, although of peculiar shape, performs in general the well known function of guiding any thread that has been moved by its carrier out of operative relation to the needles, into operative relation with a cutter 67 and a clamp 68, which respectively cut the thread and hold the end leading from the carrier clamped for further use. This cutter and clamp are not new in the art and need not be described herein further than to say that they are spring actuated to close and are opened by means of the common lever 69 passing beneath an adjusting screw 70 connected with the cutter and the upper member 71 of the clamp to raise them when said lever is raised. Lever 69 is fulcrumed on the top frame and has a depending arm which is actuated by one end of a spring pressed lever 72, also fulcrumed on the top frame. The other end of lever 72, when top frame 50 is in operative position, rests upon a vertical rod 73, which is slidably carried in stand 48 and extends downward through bed plate b, resting finally upon cam disk 22, in a position to be raised by a cam mounted on said disk. It will be understood, therefore, that the lifting of rod 73 by a cam on the cam disk opens the clamp and cutter and the dropping of the rod causes the thread to be cut and clamped.

The sequence of operation of the parts just described is as follows: Assuming that a change of yarn is desired, first a cam 74 on disk 22 is arranged to raise the bar 59 operating the desired yarn carrier 45 into operative position to be acted upon by the left hand lever 62, Fig. 7. Next, a cam 75 on disk 22 is arranged to raise rod 65, actuating said lever 62 to cause said bar 59, which has been raised, to cause the corresponding yarn carrier 45 to move down into operative position. Next, a cam 76 is arranged to raise rod 64, which actuates the bar or bars 59 that are in the lower position shown in Fig. 7, to cause the corresponding carrier or carriers to be moved up out of operative position. These successive, instead of simultaneous, movements, of the two levers 62 are preferred, to insure the placing of the new yarn in the needles before the old yarn is removed therefrom. Finally, a cam 77 is arranged to raise rod 73, which operates the cutter and clamp through levers 72 and 69. As this sequence is to be followed at each change of yarn cams 74, 75, 76 and 77 are arranged on a single cam piece 78 (see Fig. 11) which is mounted upon cam disk 22. To facilitate the correct positioning of said cam pieces upon the cam disk, a groove 79 is turned in the face of the disk and the cam pieces are provided with corresponding tongues. Equally spaced holes 80 are drilled in the base of this groove, there being one hole to each ratchet tooth. These holes coact with a depending stud on the under side of each cam piece to correctly locate the cams.

Should it be desired to introduce more than one thread at the same time into the fabric of the stocking, it will be understood that a cam 74 is provided for each of such threads; cam piece 78 affording space for four such cams, any one or more of which are provided according to the combination of threads desired. Cam pieces 78 may be thus built up and kept in stock as units, which may readily be mounted on the cam disk 22, in correct positions relatively to each other, to effect any desired change of yarn whenever, and as often as, called for.

From the upper part of the leg downward, it is desired to shape the stocking narrower toward the ankle. This is accomplished, as is well known in the art, by lowering the needle cylinder thus varying the tension of the needles, that is, causing them to pull shorter loops, making the fabric closer woven and less elastic. Similarly, in the knitting of the heel and toe of the stocking, where a reinforcing yarn is required, it is desirable to raise the needle cylinder to allow for the double thickness of yarn. This variation of tension, which is brought about by raising and lowering the needle cylinder and the sinker head resting thereon, is accomplished by the following mechanism (see Figs. 2, 7 and 12):

As above stated, the needle cylinder rests upon, and revolves in, ring e mounted in bed plate b. Ring e has two diametrically opposite pins 81, vertically slidable through holes in the bed plate, which pins rest upon the two arms of a yoked lever 82 pivoted to the underside of the bed plate, directly above cam disk 22. Thus, the needle cylinder rests by its own weight upon yoked lever 82, and may be raised or lowered thereby. For adjusting the elevation of this lever, screws 83 are arranged in a circle on the cam disk, there being one screw for each tooth of the cam disk, so that, at any or every position thereof, a screw 83 will underride, and act upon, the lower outer end of yoked lever 82, i. e., the point in the yoke of said lever midway between its pivoted ends and farthest from the axis of said pivots. The yoked lever is provided with a tangential arm 84, the end of which rests upon an adjusting screw 85 carried by the frame of the machine. Screw 85 acts as a stop to limit the depression of yoked lever 82, and may be arranged to support said lever and thereby the needle cylinder at the lowest position, that is, at the position of maximum tension desired in the fabric, where it is desired, as above stated, to decrease the tension, screw 83, corresponding to the next tooth of the cam disk, is so adjusted that it underrides and raises lever 82, thereby raising the needle cylinder. Thus it is only necessary to provide screws 83 in those holes in the circle above mentioned which correspond to the places where a decrease of the tension is desired, stop 85 supporting the needle cylinder at other times.

At the time of change from rotation to oscillation, it becomes necessary to throw out of action the rear bank of needles g. This is accomplished by causing a double ended cam 90 (see Figs. 9, 13 and 14) to be moved upward. Cam 90 is so positioned radially that it engages only the long butt needles (which, as hereinbefore stated, are the needles of the rear bank) and raises them to inactive position. Cam 90 is carried by a frame 91 mounted upon cam ring h, which frame also carries, immediately above cam 90, a similar double ended cam 92, which is so positioned radially that it operates upon the short butt needles as well as the long butt needles to bring the entire set of needles of both banks down into action again at the time of change back from oscillation to rotation. Frame 91 is slidably mounted vertically upon a post 93 and is normally held down upon ring h (its inoperative position) by a spring 94. It also carries a rod 95 extending downward through bed plate b, and resting upon cam disk 22, in such manner as to be operable by a cam 96 mounted thereon. As these changes occur twice, in formation of a stocking, namely, at the heel and toe, two such cams 96 are shown (see Fig. 11) in line to operate upon rod 95.

At the same time are moved into operative position the pickers 100 for moving out of action, one at a time, alternately, needles at opposite ends of the front bank of needles $f$, as hereinbefore stated. This is accomplished as follows: Frame $o$, by which either the rotating pinion $m$ or the oscillating pinion $n$ is moved into engagement to actuate the needle cylinder, carries a rigid arm 101 (see Fig. 5) having at its end a post 102, which passes up through bed plate $b$ and carries a frame 103 in position to act upon the tails 104 of the pickers 100 (see Figs. 7 and 9).

During the rotation of the needle cylinder, frame $o$ is in its lower position, and frame 103 carried thereby presses tails 104 of the pickers downward holding the pickers themselves up in an inactive position. At the change from rotation to oscillation, frame $o$ and with it frame 103 is raised and the pickers drop into active position, operating to elevate the needles one by one out of action in a manner fully set forth in my said Patent No. 1,186,099. This continues throughout oscillation and until the change back to rotation, at which time frame $o$ is again lowered and frame 103 moves pickers 100 out of action.

About midway in the oscillatory operation, when only a limited number of needles $f$ in the central part of the front bank remain in action, it is necessary to move those needles $f$ which have been rendered inactive, back into action again in the reverse order to that in which they were rendered inactive. This is accomplished by a double acting picker 105, mounted on cam ring $h$ on the opposite side of the needle cylinder from, and midway between pickers 100. This picker acts, the reverse of pickers 100, to successively move the needles from the inactive position down into action. Its construction is fully set forth in the last mentioned application. It may be stated that during the operation of picker 105, pickers 100 continue to act, raising one needle at a time out of action at each oscillation; but picker 105 is made to act upon two needles at a time. Consequently as one needle is moved out of action and two are moved into action at each oscillation, the net result is to eventually return all the needles of the front bank into action.

Normally, picker 105 is held down in inoperative position by an overlying finger 106 (see Figs. 9 and 12) carried in a post 107, which is slidable in a bracket on ring $h$ and extends down through the bed plate and rests upon cam disk 22. A spring 108 normally holds post 107 in this position. At the time is it desired to move the inactive needles $f$ gradually into action again, a cam 109 on disk 22 underrides said post and, by elevating it, allows the picker to become operative. As this occurs twice in the formation of each stocking, namely, in the middle of the heel and in the middle of the toe portions, two such cams 109 are arranged, as shown in Fig. 11, upon cam disk 22, in line to act upon post 107.

It is understood that the detailed construction of the mechanism of pickers 100 and 105 is not claimed herein and therefore need not be described.

It is frequently desired, at this stage of the knitting, namely, the portion of the stocking between the heel and toe, to insert a reinforcing thread $z'$ (see Fig. 16). For this purpose an auxiliary yarn carrier 145 is pivotally mounted on top frame 50 beside carriers 45. This carrier 145 is moved into operative position by a spring 146 and is rendered inoperative by the action of an arm 147, moved in turn by a lever 149, which is continually pressed upon by an arm of lever 150 under the action of a spring 151. When top 50 is raised, carrier 145 is lifted away from the underlying arm 147 and a stop 144 is provided as an abutment for the carrier. Spring 151 is of more strength than spring 146 and therefore when top frame 50 is lowered, the auxiliary yarn carrier is normally held in its upper, inactive position.

In order to render carrier 145 active, lever 150 is retracted from lever 149 by means of an intermediate lever 152 and a rod 153, the latter being vertically slidable in stand 48 and normally with its lower end resting upon cam disk 22. When it is desired to insert the reinforcing yarn, a cam 154 is provided on the cam disk, which cam underrides and elevates rod 153, thereby turning arm 152 and tipping lever 150, as shown in Fig. 16, which allows spring 146 to depress carrier 145 into action.

As it is often desirable to insert the reinforcing yarn in the under half of the foot portion of the stocking only, it is necessary to free it from the needles during half of each rotation of the needle cylinder. For this purpose a semi-circular cam 155 is mounted on the cylinder, concentric therewith, and in line with a roller upon lever 149, this cam being of such a diameter that for its semi-circular length it will act upon said roller to press out lever 149 and render carrier 145 inactive. Thus, in the rotation of the cylinder, when cam 154 on the cam disk is inactive, the auxiliary carrier will spring into and out of action every revolution, laying the reinforcing yarn in the needles which knit the lower half of the foot and allowing it to hang idly during the other half. In finishing, the loose hanging portions of the yarn subtending the unknitted half are removed.

It is understood that the toe portion of the stocking is knitted exactly the same as the heel portion, and that thereafter the change is made back to rotary knitting, starting in on the leg portion of a new stocking. Cam disk 22 has now been advanced through one complete revolution by pattern chain 31, there being just as many lugs or high links on the chain as there are ratchet teeth in the cam disk.
Continued running of the machine repeats the series of operations above described, by reason of cam disk 22 bringing the cams and screws carried thereby into action exactly as before; and thus a series of stockings is knit, the stockings being afterward separated and the ends finished off in an appropriate manner.

In case it is desired to finish off each stocking separately as it is knitted, means are provided for leveling all the needles, directly after the change back to rotation is made at the end of the toe portion, and to stop the machine. These means will now be described.
The regular knitting cams, shown in Fig. 15, may have the construction and operation well understood in the art. After the change back to rotation at the end of the knitting of the toe portion, at the end of a stocking, all the needles are in operative position, i. e., in the position they occupy in the knitting of circular fabric. At this time all the needles, save those that are at the moment in actual engagement with the knitting cams, are on the same level. It is necessary, therefore, in order to bring the needles thus engaged with the knitting cams on a level with the remaining needles, to disengage the intermediate knitting cams 110 from the needles.

As is shown in Figs. 9 and 15, these cams are mounted upon radially movable slides 111 carried by the cam ring $h$, and are held in operative position by springs 112. These slides carry on their outer ends adjusting screws 113, against which bear the upturned ends of the bell crank frame 114 (see also Fig. 7) secured, on its opposite ends, to horizontal shafts 115 turning, on the same axis, in the bed plate of the machine. By this means, if the bell crank frame is tilted, as by turning one of the shafts by means of thumb piece 116 secured thereto, slides 111 may be withdrawn radially from the needle cylinder a distance sufficient to clear both the short and long butt needles $f$ and $g$; and on the subsequent partial rotation of said cylinder, the guide cams 117 will bring the knitting needles down, so that all the needles will be on the same level, as required. I accomplish this automatically as follows: The frame end of bell crank 114 extends, through slots, within the bed plate, and is supported upon a vertically slidable rod 118, sleeved in the bed plate and resting below upon cam disk 22. In position on the disk corresponding to the last ratchet tooth of the cycle thereon, is mounted a cam 119, located radially in line to underride rod 118 (see Fig. 11) and, by tilting bell crank frame 114, dictate the leveling of the needles, as described. During any further rotation no new fabric is knitted, the knitting cams being inactive, and upon stopping the machine, the needles and fabric thereon are in readiness for the transfer operation, for the purpose of applying the top of the stocking to be next knitted, which need not be further explained, as it forms no part of my invention.

In starting the machine for knitting the next stocking, a lug on the pattern chain causes the cam disk to be racked forward a tooth, and cam 119 passes from under rod 118, allowing springs 112 to act to draw slide 111 radially inward again and return knitting cams 110 to operative position. As all of the needles are on the same level when this takes place, cams 110 will first be pressed in against the short butts of needles $f$, and in the first rotation will act upon the long butts of needles $g$, drawing them into knitting action first, and thereafter be pressed fully into their normal position to act upon the short butts of needles $f$ as well, thereby restoring the needles into position for regular circular knitting.

In order to automatically stop the machine, preparatory to the transfer operation, I have adapted, to the present machine, the specific stop mechanism set forth in Patents No. 1078677 and No. 1078679, issued to me November 18, 1913. Briefly described, such mechanism comprises (see Figs. 2 and 3) a spring pressed belt shifter 120, slidably mounted in the frame of the machine, which shifter when released will shift the driving belt from the fast pulley 121 to the loose pulley 122 upon the driving shaft $u$. In
11 starting the machine, the hand lever 123, is moved to the left, shifting the belt to the fast pulley 121, by drawing upon the head 124 attached to shifter 120. The shifter is held in this position by means of a pivoted
11 catch arm 125, which is pressed, by spring 126, in front of head 124. Catch arm 125 carries a pin 127, in position to be operated by the tail of a cam-actuated lever 128, pivoted to a bracket attached to frame $o$. The
12 opposite end of lever 128 overlies flange 19 of the sleeve 18 of cam disk 22, and in the lower position of frame $o$, i. e., during rotation, said end of lever 128 lies in the path of a cam 130, secured to flange 19 in such
12 relation to the cams upon disk 22 as to act upon lever 128 to throw out catch arm 125 and stop the machine after the needle cylinder has made a complete revolution subsequent to the operation of leveling the needles previously described. This movement of cam 130 into action, takes place in the final portion of the last ratchet movement of pawl 23 in the cycle of the cam disk in the formation of a complete stocking. Said ratchet movement, being of considerable length, lends itself readily to a division into parts or steps. By relatively positioning two or more cams brought into action at a single ratcheting of the disk, the respective operations effected thereby may be made to occur successively rather than to be strictly contemporaneous. This mode of operation is, of course, practicable only where such successive operations must, or can, occur one immediately after the other. For instance, in the present machine, during the action of the next to last lug on the pattern chain and the next to last turn of cam disk 22, operations are ordered as follows: First, cams 20 act to depress frame *o* and produce the change from oscillation to rotation. Next, cam 109 acts upon rod 107 to depress the widening picker 105 out of action. Next, frame *o* draws down frame 103, throwing the narrowing pickers 100 out of action. Next, cams 74, 75 and 76 coöperate to withdraw one yarn carrier and insert another. Finally, cam 77 actuates the cutter and clamp.

At the last turn of the cam disk 22, the following operations occur: First, cams 74 and 76 operate to raise the yarn carrier, thus withdrawing yarn from the needles. Next, cam 77 actuates the cutter and clamp. Next, cam 119 acts to raise bell crank frame 114, withdrawing knitting cams 110 and causing all the needles to be leveled. Finally, cam 130 acts upon lever 128 to release the stop motion and shift the driving belt to the loose pulley, stopping the machine.

While in the claims I have referred to a pattern chain, I do not mean thereby to limit the construction to a chain, but mean to include mechanical equivalents thereof.

I have not herein claimed the pattern mechanism for acting upon the yarn changing mechanism and the cutter and clamp, or the auxiliary yarn carrier construction, as the same form the subject matter of a divisional application filed February 19, 1916, Serial No. 79,240.

Having now fully described my invention, what I claim and desire to protect by Letters Patent is:

1. In a circular knitting machine, in combination, a rotatable needle cylinder, driving mechanism including rotary driving means and oscillatory driving means, vertically movable shifting mechanism for alternately connecting the two driving means with the needle cylinder, a cam disk rotatable on a vertical axis, a pattern chain, means controlled by the pattern chain and operable from the driving mechanism to turn the cam disk step by step, and cams turning with the cam disk and adapted, during one rotation thereof, to actuate the shifting mechanism twice in each direction.

2. In a circular knitting machine, in combination, a rotatable needle cylinder, driving mechanism including rotary driving means and oscillatory driving means, vertically movable shifting mechanism for alternately connecting the two driving means with the needle cylinder, a cam disk rotatable on a vertical axis, means to turn the cam disk step by step, a sleeve turning with the cam disk, a flange on the sleeve, and upper and lower peripheral cams on the flange adapted to engage and actuate the shifting mechanism in respectively opposite directions.

3. In a circular knitting machine, in combination, driving mechanism including a rotating cam, a cam disk, knitting mechanism whose operation is controlled by the cam disk, a ratchet on the cam disk, a slide restrained from lateral movement, a pawl pivoted on the slide, a spring-actuated lever adapted to be oscillated by the cam and connected with the slide so as to reciprocate the same thereby ratcheting the cam disk, a spring-actuated pivoted lock for the slide adapted, on the advance of the slide, to move into position to hold the slide from retraction, one of the mutually engaging locking faces of the lock and slide being beveled to prevent partial retraction of the slide, and pattern mechanism adapted at intervals to withdraw the lock from operative position, thereby releasing the slide and allowing its actuating lever to be retracted by its actuating spring and advanced by its actuating cam.

4. In a circular knitting machine, in combination, a rotatable and vertically movable needle cylinder, a ring on which said cylinder rests, pins depending from the ring, a pivoted yoke lever upon which said pins rest, a support normally upholding the lever, a rotatable cam disk, a device on the cam disk adapted to underride the lever and lift it from its normal support, and means to turn the cam disk step by step.

5. In a circular knitting machine, in combination, a rotatable and vertically movable needle cylinder and gear secured together, a fixed ring upon which the gear rests and turns, pins depending from the ring, a lever pivoted on a horizontal axis, said pins supported by the lever, vertically adjustable means supporting the free end of the lever, a rotatable cam disk, a device on the cam disk adapted to underride the lever and lift it from its support, and pattern controlled means to turn the cam disk step by step.

6. In a circular knitting machine, in combination, a rotatable needle cylinder, driving mechanism including rotary driving means and oscillatory driving means, shifting mechanism for alternately connecting the two driving means with the needle cylinder, a rotatable cam disk, pattern mechanism, means controlled from the pattern mechanism and actuated by the driving means to turn the disk step by step, means controlled by the cam disk to actuate the shifting mechanism, a front bank of short butt needles and a rear bank of long butt needles, a vertically movable frame, a cam carried by the frame adapted to engage and elevate the long butt needles, a cam carried by the frame adapted to engage and depress long and short butt needles, and means, independent of the shifting mechanism, controlled by the cam disk and adapted to control the vertical movement of the frame.

7. In a circular knitting machine, in combination, a rotatable needle cylinder, a front bank of short butt needles and a rear bank of long butt needles, a vertically movable frame, a cam carried by the frame adapted to engage and elevate the long butt needles, a cam carried by the frame, adapted to engage and depress long and short butt needles, a spring tending to hold the frame in its lower position, a rod depending from the frame, a cam disk, means to turn the cam disk step by step, and a cam on the disk adapted to directly engage and lift the rod thereby elevating the frame.

8. In a circular knitting machine, in combination, a rotatable needle cylinder, driving mechanism including rotary driving means and oscillatory driving means, a vertically movable frame and means connected therewith adapted to alternately connect the two driving means with the needle cylinder, a cam disk, a pattern chain, means controlled by the pattern chain and actuated by the driving mechanism to turn said disk step by step, cams turning with the cam disk and adapted to lift and lower said frame, a picker adapted to successively actuate certain needles, an arm carried by the frame, a post carried by the arm, and a frame carried by the post adapted, in one position of the first named frame, to hold the picker inoperative.

9. In a circular knitting machine, in combination, a rotatable needle cylinder, driving mechanism including rotary driving means and oscillatory driving means, a vertically movable frame and means connected therewith adapted to alternately connect the two driving means with the needle cylinder, a cam disk, a pattern chain, means controlled by the pattern chain and actuated by the driving mechanism to turn said disk step by step, cams turning with the cam disk and adapted to lift and lower said frame, a pair of pickers adapted to successively actuate certain needles, an arm carried by the frame, a post carried by the arm, and a frame carried by the post adapted, when the first named frame is moved to connect the rotary driving means with the needle cylinder, to engage both pickers and render them inoperative.

10. In a circular knitting machine, in combination, a rotatable needle cylinder, driving mechanism including rotary driving means and oscillatory driving means, shifting mechanism for alternately connecting the two driving means with the needle cylinder, a cam disk, means to turn the disk step by step, cams turning with the cam disk and adapted to actuate the shifting mechanism, a withdrawing picker adapted to successively move certain needles out of action, a reinstating picker adapted to successively return said needles into action, devices movable by the shifting mechanism and adapted to control the operation of the withdrawing picker, and a cam on the disk adapted to control the operation of the reinstating picker.

11. In a circular knitting machine, in combination, a needle cylinder, the knitting cams, a turnable shaft, a frame carried thereby adapted to be swung into position to withdraw the knitting cams from operative relation with the needles, a rotatable cam disk, means to turn the disk step by step, a cam on the disk, and means operable by the cam to so swing the frame.

12. In a circular knitting machine, in combination, a needle cylinder, the knitting cams, slides carrying the same, a bell crank frame comprising depending legs pivoted on a common axis and a connecting yoke member, a vertically movable rod adapted when raised to engage the yoke member and swing the frame into position to retract the slides, and pattern-controlled mechanism to lift the rod.

13. In a circular knitting machine, in combination, a needle cylinder, the knitting cams, spring-actuated slides carrying the same, a bell-crank frame comprising depending legs, a connecting yoke member, and a shaft to which the legs are secured, a rotatable cam disk, means to turn the disk step by step, a cam carried by the disk, and means operable by the cam adapted to engage the yoke and swing the frame into position to retract the slides.

14. In a circular knitting machine, in combination, a needle cylinder, driving mechanism including rotary driving means and oscillatory driving means, shifting mechanism for alternately connecting the two driving means with the needle cylinder, stop mechanism connected with and adapted to stop the driving mechanism, a rotatable cam disk, means to turn the same step by step, a sleeve on the disk, a flange on the sleeve, cams on the flange adapted to operate the shifting mechanism, and a cam on the flange adapted to operate the stop mechanism.

15. In a circular knitting machine, in combination, a rotatable needle cylinder, driving means including rotary driving means and oscillatory driving means, shifting mechanism for connecting the two driving means alternately with the needle cylinder, pickers adapted to successively raise out of action certain needles of the front bank, other mechanism controlling the knitting operation, a rotatable cam disk arranged beneath and in concentric relation to the needle cylinder, a pattern chain controlling the step-by-step operation of the cam disk from the driving means, cams turning with the cam disk and adapted respectively to operate said mechanisms, and means operated by the shifting mechanism to control the movement of said pickers into and out of operative position.

In testimony of which invention, I have hereunto set my hand, at Philadelphia, on this 18th day of September, 1915.

HARRY A. HOUSEMAN.